R. F. GRADY.
MOLD AND METHOD FOR FORMING MONOLITHS.
APPLICATION FILED JUNE 1, 1920.

1,417,599.

Patented May 30, 1922.

Attest.
Charles A. Becker.

Inventor
Robert F. Grady
by Riffey Kingsland
His Attorneys

UNITED STATES PATENT OFFICE.

ROBERT F. GRADY, OF ST. LOUIS, MISSOURI.

MOLD AND METHOD FOR FORMING MONOLITHS.

1,417,599.   Specification of Letters Patent.   Patented May 30, 1922.

Application filed June 1, 1920. Serial No. 385,617.

*To all whom it may concern:*

Be it known that I, ROBERT F. GRADY, a citizen of the United States, residing at the city of St. Louis and State of Missouri, have invented a new and useful Mold and Method for Forming Monoliths, of which the following is a specification.

This invention relates to a mold and method for forming monoliths, and consists in the novel construction and procedure hereinafter set forth.

An object of the invention is to provide a mold and the method of utilizing the same, whereby monolithic structures may be made and duplicated from one mold, with provision for forming upon the structure either raised or incised letters, numerals, characters or designs.

Another object of the invention is to provide a mold and the method of using the same to form a monolithic structure having selected letters, numerals, characters and designs on a face or faces thereof, with provision whereby the letter, numeral, character or design-forming matrices will move in conformity with the contraction or movement of the body of the structure during the course of the formation thereof in the mold.

Additional advantages of the mold and the method will be apparent from the following detailed description of the invention taken in connection with the accompanying drawing, in which—

Figure 1:
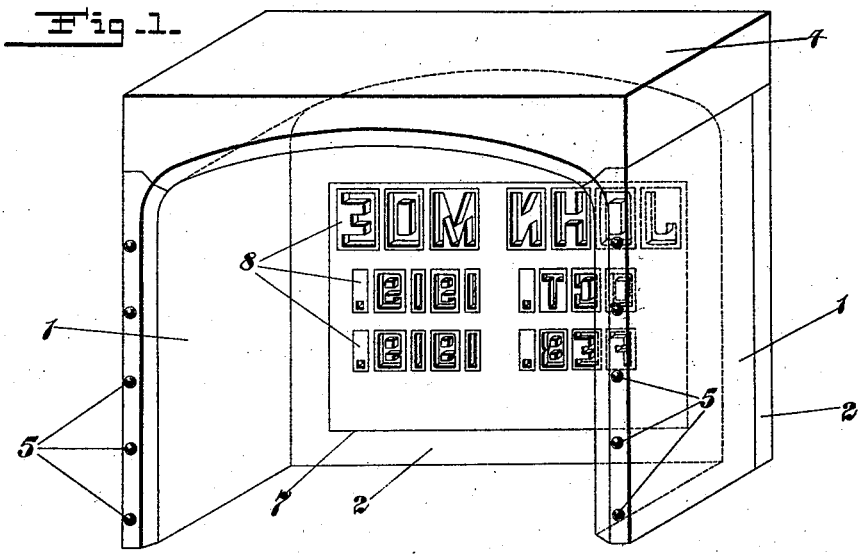
Fig. 1 is a perspective view of the mold showing one wall thereof removed.
Figure 2:
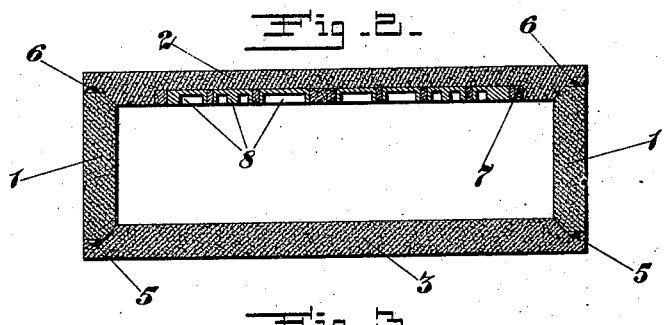
Fig. 2 is a cross section through the mold.
Figure 3:
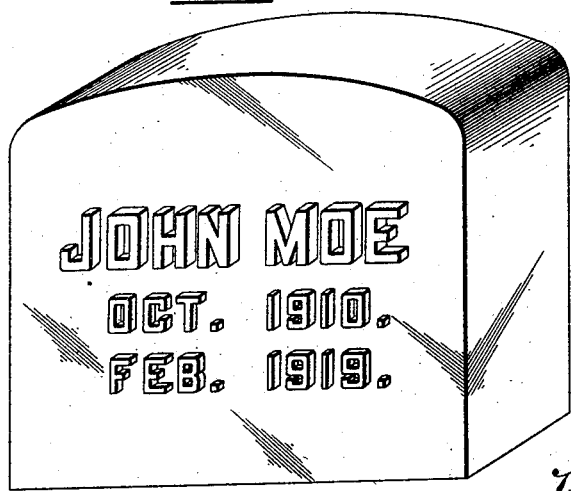
Fig. 3 is a structure formed in the mold by the practice of the invention.

For the purpose of illustration the form of mold selected is one for forming a monolith suitable for a head stone, although it will be understood that the invention may be utilized for forming various monoliths of any desired contour.

The mold structure is formed from slabs preferably composed of plaster of Paris, or other suitable material may be employed, and comprises end walls 1, a front wall 2, a rear wall 3 and a top 4. The matching edges of the members of the mold being arranged to fit closely together, and in order that the various members of the mold may be assembled with facility and properly centered, suitable knobs 5 are formed on one of the matching faces and registering recesses 6 are formed on the other of the matching faces. One or more of the walls may be formed with a recess 7 in its inner face which is adapted to receive the matrices for forming the letters, numerals, characters or designs upon the face of the structure formed by the mold. These matrices are preferably in the form of blocks 8 having a letter, numeral, character or design recessed in the face thereof or rising in relief from the face thereof, as may be desired.

Obviously, when the letters, numerals, characters or designs are recessed in the face of the matrices the letters, numerals, characters or designs on the structure will be in relief and, conversely, when the letters, numerals, characters or designs are in relief on the blocks 8 they will form incised letters, numerals, characters or designs in the structure.

The mold is prepared for forming the various inscriptions before it is assembled by properly arranging the block-carrying matrices in alinement and at proper intervals in the recess or recesses 7. The space between the blocks is filled in with plastic clay, or other suitable material and the area of the recess not occupied by the blocks is filled in with the same material. This material serves to hold the blocks in their proper adjustment and to present a smooth molding surface throughout the area of the recess.

In practice the inner surface of the mold elements are then covered with plastic clay or similar material, and the same is packed closely against the surface. The mold is then assembled and further packed with plastic clay, or other suitable material as may be used in forming the structure.

After the mold has been filled the elements of the mold are secured together and the structure allowed to dry. During the drying process there will be a slight shrinkage of the material but, inasmuch as the blocks containing the different characters are set up in the same material, there will be shrinkage thereof substantially uniform with the shrinkage of the material of the structure. In other words, the character-forming matrices will move in substantial uniformity with the contraction of the surface of the structure upon which the characters are formed. After the structure has dried sufficiently to become set, the mold elements are released and removed from the structure. The structure may then be treated and baked, Obviously, from the foregoing it will be understood that by the mold and method of this invention any desired characters may be formed in integral union with the body of the structure and that the characters thus formed will be sharp in outline and will retain the original alinement conforming to the arrangement thereof in preparation of the mold when the block-carrying matrices are set up in the recesses.

Various modifications may be made without departing from the spirit and scope of the invention. What I claim and desire to secure by Letters Patent, is:—

1. In a mold of the class described, the combination of one side of the mold, matrices disposed on the inner face of said mold, a plastic composition surrounding the matrices and securing them to the wall, said composition possessing approximately the same shrinking qualities as the article forming material whereby the matrices will be permitted to shift position as the material shrinks.

2. In a mold of the class described, the combination of one side of the mold having a recess in its inner face, matrices disposed in said recess, a plastic composition surrounding the matrices, said composition being shrinkable to approximately the same degree as the article forming material whereby the matrices will be permitted to shift position as said material shrinks.

3. A method of casting a monolithic structure and forming an imprint thereon consisting in holding a matrix in a mold, by a plastic composition around the matrix and placing the structure forming plastic in the mold before hardening of said first mentioned plastic composition.

4. A mold, including a wall having a recess in the inner face thereof, solid blocks carrying character-forming matrices, and yieldable material for filling said recess and holding said blocks within said recess.

5. The method of forming a monolith, which consists in setting matrices in a yieldable material in a recess of a wall of the mold, packing plastic material against said mold wall, and allowing said material to set in said mold.

ROBERT F. GRADY.